(12) United States Patent
Rugeland et al.

(10) Patent No.: US 12,022,333 B2
(45) Date of Patent: Jun. 25, 2024

(54) HANDOVER WITH ZERO MS USER PLANE INTERRUPTION

(71) Applicant: TELEFONAKTIEBOLAGET LM ERICSSON (PUBL), Stockholm (SE)

(72) Inventors: Patrik Rugeland, Stockholm (SE); Stefan Wager, Espoo (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/480,570

(22) PCT Filed: Jan. 31, 2018

(86) PCT No.: PCT/IB2018/050614
§ 371 (c)(1),
(2) Date: Jul. 24, 2019

(87) PCT Pub. No.: WO2018/142308
PCT Pub. Date: Aug. 9, 2018

(65) Prior Publication Data
US 2019/0357097 A1 Nov. 21, 2019

Related U.S. Application Data

(60) Provisional application No. 62/454,570, filed on Feb. 3, 2017.

(51) Int. Cl.
*H04W 36/36* (2009.01)
*H04W 12/041* (2021.01)
(Continued)

(52) U.S. Cl.
CPC ..... *H04W 36/0069* (2018.08); *H04W 12/041* (2021.01); *H04W 56/001* (2013.01); *H04W 84/045* (2013.01); *H04W 92/20* (2013.01)

(58) Field of Classification Search
CPC ......... H04W 12/0401; H04W 36/0069; H04W 56/001; H04W 84/045; H04W 92/20
See application file for complete search history.

(56) References Cited

U.S. PATENT DOCUMENTS

2013/0115958 A1* 5/2013 Wei ................. H04L 5/0007
455/437
2015/0208235 A1* 7/2015 Ingale ................... H04W 80/02
455/411
(Continued)

FOREIGN PATENT DOCUMENTS

CN 104936163 A 9/2015
CN 105101359 A 11/2015
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); 3GPP TS 36.300 V14.1.0, Dec. 2016.
(Continued)

*Primary Examiner* — Khaled M Kassim
*Assistant Examiner* — Zhaohui Yang
(74) *Attorney, Agent, or Firm* — Sage Patent Group

(57) ABSTRACT

According to certain embodiments, disclosed is a method in a master node (MN) for minimizing user plane interruption delay. The method includes transmitting a handover request message to a secondary node (SN), receiving a handover request acknowledge message from the SN, and transmitting a reconfiguration instruction to a wireless device operating in dual connectivity with the MN and the SN. The reconfiguration instruction may include a new configuration
(Continued)

wherein the SN is a target SN and an indication of a trigger used to switch to the new configuration.

20 Claims, 9 Drawing Sheets

(51) Int. Cl.
*H04W 36/00* (2009.01)
*H04W 56/00* (2009.01)
*H04W 84/04* (2009.01)
*H04W 92/20* (2009.01)

(56) References Cited

U.S. PATENT DOCUMENTS

| | | | |
|---|---|---|---|
| 2016/0255675 A1* | 9/2016 | Van Lieshout | H04W 76/25 370/329 |
| 2016/0330680 A1* | 11/2016 | Yi | H04W 48/20 |
| 2017/0034866 A1 | 2/2017 | Wager et al. | |
| 2017/0099621 A1* | 4/2017 | Michaelsen | H04W 36/0033 |
| 2017/0150405 A1* | 5/2017 | Chiba | H04W 12/041 |
| 2018/0054846 A1* | 2/2018 | Nagasaka | H04W 74/0833 |
| 2019/0109663 A1* | 4/2019 | Kusano | H04W 74/02 |

FOREIGN PATENT DOCUMENTS

| | | | | |
|---|---|---|---|---|
| CN | 103533663 B | * | 2/2017 | |
| WO | 2014209204 A1 | | 12/2014 | |
| WO | WO 2014/209204 A1 | * | 12/2014 | ............ H04W 76/02 |
| WO | WO-2016122231 A1 | * | 8/2016 | ........ H04W 56/0005 |

OTHER PUBLICATIONS

Ericsson, SeNB to MeNB reconfiguration for NR dual-connectivity, Tdoc R2-1700487, 3GPP TSG-RAN WG2 NR Ad Hoc, Spokane, USA, Jan. 17-19, 2017.
First Chinese Office Action for Chinese Patent Application No. CN 201880022886.6 dated Jan. 26, 2022, 8 pages (including English translation).
ZTE, 3GPP TSG-RAN WG3 #87, R3-150238, "Consideration on the Inter-MeNB Handover Enhancement in Dual Connectivity", Feb. 9-13, 2015, Athens, Greece, 8 pages.
Ericsson, 3GPP TSG-RAN WG3 Meeting #88, R3-151304, "TP on Uniqueness of the SeNB UE X2AP ID", May 25-29, 2015, Fukuoka, Japan, 6 pages.
Third Chinese Office Action for Chinese Patent Application No. CN 201880022886.6 dated Nov. 28, 2022, 13 pages (including English translation).
Intel et al., "Introduction of RACH-less and make before break", 3GPP TSG RAN WG2 Meeting #96, R2-169152, Reno, Nevada, Nov. 14-18, 2016, 10 pages.

* cited by examiner

HANDOVER WITH ZERO MS USER PLANE INTERRUPTION

This application is a 371 of International Application No. PCT/162018/050614, filed Jan. 31, 2018, which claims the benefit of U.S. Application No. 62/454,570, filed Feb. 3, 2017, the disclosures of which are fully incorporated herein by reference.

TECHNICAL FIELD

Embodiments of the present disclosure are directed to wireless communications and, more particularly, to minimizing user plane interruption delay during dual connectivity handover.

BACKGROUND

The 3GPP TR 38.913 includes a requirement for new radio (NR) regarding mobility interruption time. Specifically, the target for mobility interruption time should be 0 ms:

Mobility interruption time means the shortest time duration supported by the system during which a user terminal cannot exchange user plane packets with any base station during transitions. The target for mobility interruption time should be 0 ms. This KPI is for both intra-frequency and inter-frequency mobility for intra-NR mobility.

One potential way of meeting this 0 ms mobility interruption time target is through the use of dual connectivity (DC). When the user equipment (UE) moves toward a new node, the current serving node (master node) can add that new node as a secondary node for user plane communication with the UE. When the radio link between master node and UE has problem during mobility toward the secondary node, the network and UE can still perform user plane communication via the secondary node to meet the 0 ms interruption requirement. The term "mobility" may refer to the transfer of the control plane endpoint in the network.

Security Keys

In order to securely exchange information (e.g., voice and/or data) over the network, the various network systems (e.g., UE, eNB, mobility management entity (MME), AuC) may utilize security keys. The keys can be ordered in a hierarchy where keys on lower levels in the hierarchy are derived from keys at the same or higher levels. The top-level key is K, and it has a permanent value stored in USIM and the home subscriber server (HSS) (authentication center (AuC)). From this K, ciphering key (CK) and integrity key (IK) are derived during the authentication procedure running between the UE and the HSS/MME. From the CK and IK, the UE and HSS derive a key called $K_{ASME}$. The HSS forwards the $K_{ASME}$ to the MME. From the $K_{ASME}$, non-asscess stratum (NAS) keys $K_{NASint}$, $K_{NASenc}$ and $K_{eNB}$ are derived at the MME. And access stratum (AS)—between eNB and UE—security keys ($K_{RRCint}$, $K_{RRCenc}$, $K_{UPenc}$) are derived from KeNB, which is forwarded by MME, at eNB.

Dual Connectivity and Security Keys

In LTE Rel-12, the concept of dual connectivity was introduced to allow a UE to utilize radio resources from two different base stations (e.g., two eNBs) simultaneously. The eNB the UE connects to firsts is referred to as the master eNB (MeNB) and it can configure the UE to connect to a secondary eNB (SeNB).

As shown in FIGS. 1 and 2, the UE traffic can then be routed to the SeNB either via the MeNB with a split bearer (MCG-split bearer) or directly from the CN with a SCG-bearer. In NR it is also proposed to introduce a SCG-split bearer shown in FIG. 3 for the LTE-NR case. In all of these cases, the MeNB controls the configurations of the UE and SeNB.

The security in LTE is based on a session key $K_{eNB}$ which is shared between the UE and the eNB. In dual connectivity, the UE is connected to both the MeNB and the SeNB. The UE shares the $K_{eNB}$ with the MeNB as it would with any regular eNB. This $K_{eNB}$ forms the root of a key hierarchy for dual connectivity and may therefore sometimes be referred to as root key for dual connectivity. In addition, the MeNB and the UE derive a key called S-$K_{eNB}$ from the $K_{eNB}$. The MeNB sends the S-$K_{eNB}$ to the SeNB, and the protection of the communication between the UE and the SeNB is based on the S-$K_{eNB}$.

Handovers in LTE

The security model in LTE is such that after a UE is handed over from a source eNB to a target eNB, the core network (NW) sends a key—unknown to the source eNB—to the target eNB. The UE can calculate this key on its own from information it shares with the core NW. The key is called Next Hop key (NH). Since the source eNB does not know of the NH, security can be re-initialized between the UE and the target eNB based on the NH, and in doing so, the source eNB will be unable to eavesdrop on the traffic between the UE and the target eNB.

In LTE, the procedure of handover between eNBs is performed using the RRC message RRCConnectionReconfiguration, including mobilityInformation, where the UE is informed of how it can connect to the target, also called new, eNB. To ensure that the target eNB will not have access to security information related to the communication between the UE and the source eNB, the source eNB derives a new security key, $K_{eNB*}$, based on either the currently used $K_{eNB}$ or from the NH key. Whether the UE is supposed to use the NH key or the $K_{eNB}$ is signaled from the source eNB to the UE in the mobilityInformation. This signal is called Next-hop Chaining Count (NCC). Should the old eNB be malicious or compromised, it will be able to eavesdrop or disrupt the communication between the UE and the new eNB until the new eNB re-initializes the security with the UE based on its own NH key.

Notably, in order to synchronize the usage of the $K_{eNB*}$ between the UE and the target eNB, the UE has to perform a random access (RA) procedure. This disrupts the transmission of data and makes 0 ms handover disruption difficult.

Intra-MME/Serving Gateway Handover Procedure

FIG. 4 is a diagram illustrating signaling flow for an LTE handover operation. Specifically, FIG. 4 depicts the basic handover scenario where neither the MME nor the Serving Gateway changes. Steps 0-18 describe the handover procedure:

0) The UE context within the source eNB contains information regarding roaming and access restrictions which were provided either at connection establishment or at the last TA update.

1) The source eNB configures the UE measurement procedures according to the roaming and access restriction information and e.g. the available multiple frequency band information. Measurements provided by the source eNB may assist the function controlling the UE's connection mobility.

2) A MEASUREMENT REPORT is triggered and sent to the eNB.

3) The source eNB makes a decision based on MEASUREMENT REPORT and RRM information to hand off the UE.
4) The source eNB issues a HANDOVER REQUEST message to the target eNB passing necessary information to prepare the handover at the target side (e.g., UE X2 signaling context reference at source eNB, UE S1 EPC signaling context reference, target cell ID, $K_{eNB*}$, RRC context including the C-RNTI of the UE in the source eNB, AS-configuration, E-RAB context and physical layer ID of the source cell+short MAC-I for possible RLF recovery). UE X2/UE S1 signaling references enable the target eNB to address the source eNB and the EPC. The E-RAB context includes necessary RNL and TNL addressing information, and QoS profiles of the E-RABs.
5) Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").
6) The target eNB prepares handover with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

Steps 7 to 16 provide the procedures to avoid data loss during handover.

7) The target eNB generates the RRC message to perform the handover, e.g., RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (e.g., new C-RNTI, target eNB security algorithm identifiers, and optionally dedicated RACH preamble, target eNB SIBs, etc.) and is commanded by the source eNB to perform the handover. The UE does not need to delay the handover execution for delivering the HARQ/ARQ responses to source eNB.
8) The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.
9) After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.
10) The target eNB responds with UL allocation and timing advance.
11) When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.
12) The target eNB sends a PATH SWITCH REQUEST message to MME to inform that the UE has changed cell.
13) The MME sends a MODIFY BEARER REQUEST message to the Serving Gateway.
14) The Serving Gateway switches the downlink data path to the target side. The Serving gateway sends one or more "end marker" packets on the old path to the source eNB and then can release any U-plane/TNL resources towards the source eNB.
15) The Serving Gateway sends a MODIFY BEARER RESPONSE message to MME.
16) The MME confirms the PATH SWITCH REQUEST message with the PATH SWITCH REQUEST ACKNOWLEDGE message.
17) By sending the UE CONTEXT RELEASE message, the target eNB informs success of handover to source eNB and triggers the release of resources by the source eNB. The target eNB sends this message after the PATH SWITCH REQUEST ACKNOWLEDGE message is received from the MME.
18) Upon reception of the UE CONTEXT RELEASE message, the source eNB can release radio and C-plane related resources associated to the UE context. Any ongoing data forwarding may continue.

MeNB to eNB Change

The MeNB to eNB change procedure is used to transfer context data from a source MeNB/SeNB to a target eNB. FIG. 5 is a diagram illustrating signaling flow for a master node to other network node change procedure. Specifically, FIG. 5 shows an example signaling flow for the MeNB to eNB change procedure. Steps 1-15 provide context of the handover procedure:

1) The source MeNB starts the MeNB to eNB change procedure by initiating the X2 Handover Preparation procedure. The source MeNB includes the SCG configuration in the HandoverPreparationInformation.
2) The target eNB includes the field in handover command which releases SCG configuration, and may also provide forwarding addresses to the source MeNB. The addition of an SeNB can be initiated only after completing handover.

3) If the allocation of target eNB resources was successful, the MeNB initiates the release of the source SeNB resources towards the source SeNB. If data forwarding is needed, the MeNB provides data forwarding addresses to the source SeNB. Either direct data forwarding or indirect data forwarding is used for SCG bearer. Only indirect data forwarding is used for Split bearer. Reception of the SeNB Release Request message triggers the source SeNB to stop providing user data to the UE and, if applicable, to start data forwarding.
4) The MeNB triggers the UE to apply the new configuration. Upon receiving the new configuration, the UE releases the entire SCG configuration.
5)-6) The UE synchronizes to the target eNB
7)-8) If applicable, data forwarding from the source SeNB takes place. It may start as early as the source SeNB receives the SeNB Release Request message from the MeNB.
9)-13) The target eNB initiates the S1 Path Switch procedure.
14) The target eNB initiates the UE Context Release procedure towards the source MeNB.
15) Upon reception of the UE CONTEXT RELEASE message, the S-SeNB can release radio and C-plane related resource associated to the UE context. Any ongoing data forwarding may continue.

Mobility Enhancements

In LTE Rel-14, it is proposed to support reduced latency for handover as can be seen in FIG. 6. In FIG. 6, the UE maintains its connection to the source eNB between the RRCConnectionReconfiguration and the Synchronization of the target eNB (from CR R2-169152). However, there are a number of technical issues regarding the proposed reduced latency for handover as proposed in Rel-14. Even with the proposed handover scheme, there is still some interruption when the UE performs the synchronization to the target eNB.

SUMMARY

To address the foregoing problems, disclosed is a method in a wireless device for reducing user plane interruption during handover. The method includes operating in dual connectivity with a master node (MN) and a secondary node (SN) and receiving a reconfiguration instruction from the MN. The reconfiguration instruction includes a new configuration wherein the SN is a target SN and an indication of a trigger used to switch to the new configuration. The method further includes receiving the trigger from the target SN; and switching to the new configuration.

Also disclosed is a wireless device for minimizing user plane interruption delay. The wireless device includes processing circuitry operably coupled to a transceiver. The processing circuitry may be configured to operate in dual connectivity with a master node (MN) and a secondary node (SN). The transceiver may be configured to receive a reconfiguration instruction from MN. The reconfiguration instruction may include a new configuration wherein the SN is a target SN and an indication of a trigger used to switch to the new configuration. The interface may be further configured to receive the trigger from the target SN and the processing circuitry may be further configured to switch to the new configuration.

In some embodiments, the trigger to switch to the new configuration is a dynamic uplink allocation or downlink assignment received from the target SN. In some embodiments, the trigger to switch to the new configuration is a random access allocation received from the target SN. In some embodiments, the trigger to switch to the new configuration is a pre-allocated uplink allocation or downlink assignment received from the target SN.

In certain embodiments, the reconfiguration instruction further comprises security key information for the new configuration. The security key information may include an instruction to utilize a previously derived S-KeNB. In some embodiments, the security key information comprises an instruction to calculate a new KeNB and a new S-KeNB.

In certain embodiments, an old KeNB and an old S-KeNB are used while operating in dual connectivity. And, in some embodiments, the security key information includes one or more instructions to calculate a new KeNB, calculate a new S-KeNB, change from the old KeNB to the new KeNB when the trigger is received, and change from the old S-KeNB to the new S-KeNB when the trigger is received.

In some embodiments, the method includes receiving, from the MN using the transceiver, an indication in a PDCP message of one or more security keys to utilize in the new configuration. In some embodiments, the method includes receiving, from the MN using the transceiver, an indication in a RRC message of one or more security keys to utilize in the new configuration.

In certain embodiments, an old KeNB and an old S-KeNB are used while operating in dual connectivity, and the method further includes calculating a new KeNB; calculating a new S-KeNB; changing from the old KeNB to the new KeNB when the trigger is received; and changing from the old S-KeNB to the new S-KeNB when the trigger is received.

In some embodiments, operating in dual connectivity comprises using a master cell group (MCG) bearer with the MN and a secondary cell group (SCG) bearer with the SN. In some embodiments, the reconfiguration instruction further comprises instructions to switch the MCG bearer to the target SN when the trigger is received and switch the SCG bearer to the MN when the trigger is received.

In certain embodiments, operating in dual connectivity comprises using a split MCG bearer. In some embodiments, the reconfiguration instruction further comprises instructions to switch a MCG part of the split MCG bearer to the target SN when the trigger is received and switch a secondary cell group (SCG) part of the MCG bearer to the MN when the trigger is received.

In certain embodiments, operating in dual connectivity comprises using a split secondary cell group (SCG) bearer. In some embodiments, the reconfiguration instruction further comprises instructions to switch MCG part of the split SCG bearer to the target SN when the trigger is received and switch a SCG part of the split SCG bearer to the MN when the trigger is received.

In some embodiments, the reconfiguration instruction is received as part of one or more of a radio resource control (RRC) connection reconfiguration message and a mobilityControlInformation message. And, In some embodiments, at least one of the MN and the SN are a gNB.

Also disclosed is a method in a master node (MN) for minimizing user plane interruption delay. The method may include transmitting a handover request message to a secondary node (SN), receiving a handover request acknowledge message from the SN, and transmitting a reconfiguration instruction to a wireless device operating in dual connectivity with the MN and the SN. In some embodiments, the reconfiguration instruction includes a new configuration wherein the SN is a target SN an indication of a trigger used to switch to the new configuration.

Also disclosed is a master node (MN) for minimizing user plane interruption delay. The MN may include a transceiver operably coupled to processing circuitry. The transceiver may be configured to issue a handover request message to a secondary node (SN), receive a handover request acknowledge message from the SN; and transmit a reconfiguration instruction to a wireless device operating in dual connectivity with the MN and the SN. The reconfiguration instruction may include a new configuration wherein the SN is a target SN and an indication of a trigger used to switch to the new configuration.

In some embodiments, the trigger is a dynamic uplink allocation or downlink assignment sent from the target SN. In some embodiments, the trigger is a random access allocation sent from the target SN.

In some embodiments, the reconfiguration instruction includes security key information for the new configuration. In some embodiments, the security key information comprises an instruction to utilize a previously derived S-KeNB. In some embodiments, the security key information comprises an instruction to calculate a new KeNB and a new S-KeNB.

In certain embodiments, the security key information comprises an instruction to: calculate a new KeNB; calculate a new S-KeNB; change from the old KeNB to the new KeNB when the trigger is received; and change from the old S-KeNB to the new S-KeNB when the trigger is received.

In some embodiments, the method includes transmitting, to the wireless device via the transceiver, an indication in a PDCP message of one or more security keys to utilize in the new configuration. In some embodiments, the method includes transmitting, to the wireless device via the transceiver, an indication in a RRC message of one or more security keys to utilize in the new configuration. In some embodiments, the method includes forwarding, via the transceiver, downlink data to the target SN. In some embodiments, the method includes duplicating, via the processing circuitry, the downlink data so that the downlink data is available for use by the MN and for forwarding to the target SN. In some embodiments, forwarding downlink data to the target SN starts before the new configuration is implemented.

Also disclosed is a method in a secondary node (SN) for minimizing user plane interruption delay. The method includes receiving a handover request message from a master node (MN), transmitting a handover request acknowledge message to the MN, transmitting a trigger to a wireless device, the wireless device operating in dual connectivity with the MN and the SN. In some embodiments, the trigger indicates that the wireless device is to switch to a new configuration wherein the SN is a target SN.

Also disclosed is a secondary node (SN) for minimizing user plane interruption delay. The SN may include a transceiver operably coupled to processing circuitry. The transceiver may be configured to receive a handover request message from a master node (MN), transmit a handover request acknowledge message to the MN, transmit a trigger to a wireless device, the wireless device operating in dual connectivity with the MN and the SN, wherein the trigger indicates that the wireless device is to switch to a new configuration wherein the SN is a target SN.

In some embodiments, the trigger is a dynamic uplink allocation or downlink assignment transmitted to the wireless device. In some embodiments, the trigger is a random access allocation transmitted to the wireless device. In some embodiments, the trigger is a pre-allocated uplink allocation or downlink assignment transmitted to the wireless device.

In some embodiments, prior to transmitting the trigger, the method includes receiving one or more synchronization messages from the wireless device. In some embodiments, the method includes, receiving, via the transceiver, a reconfiguration complete message from the wireless device. In some embodiments, the method further includes, receiving, via the transceiver, downlink data from the MN.

Certain embodiments of the present disclosure may provide one or more technical advantages. For example, certain embodiments may guarantee 0 ms user plane interruption during inter-frequency handover, thereby improving network connectivity. Particular embodiments may also reduce latency in UE connections to the network. Other advantages may be readily available to one having skill in the art, while certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there exist a number of technical issues with the proposed Rel-14 latency reduction solution, including interruption when a wireless device performs synchronization to the target network node (e.g., eNB, gNB). Embodiments of the present disclosure provide technical solutions for these and other issues by utilizing inter-frequency handovers from the master network node (e.g., MeNB, MgNB) to the secondary network node (e.g., SeNB, SgNB). Since in case of dual connectivity, the wireless device has independent Rx/Tx chains for the two network nodes (e.g., the two e/gNBs), it is possible to switch from the source eNB to the target eNB without any user plane interruption.

Particular embodiments are described with reference to FIGS. 7-10 of the drawings, like numerals being used for like and corresponding parts of the various drawings. LTE/5G/NR are used throughout this disclosure as example cellular systems, but the ideas presented herein may apply to other wireless communication systems as well. Moreover, various embodiments of the present disclosure are discussed in terms of an eNB with the understanding that the embodiments may be applied to any network node, including gNBs. FIGS. 7-10 provide additional explanation for improved switching from the source eNB to the target eNB to achieve handover with 0 ms user plane interruption.

Figure 7:
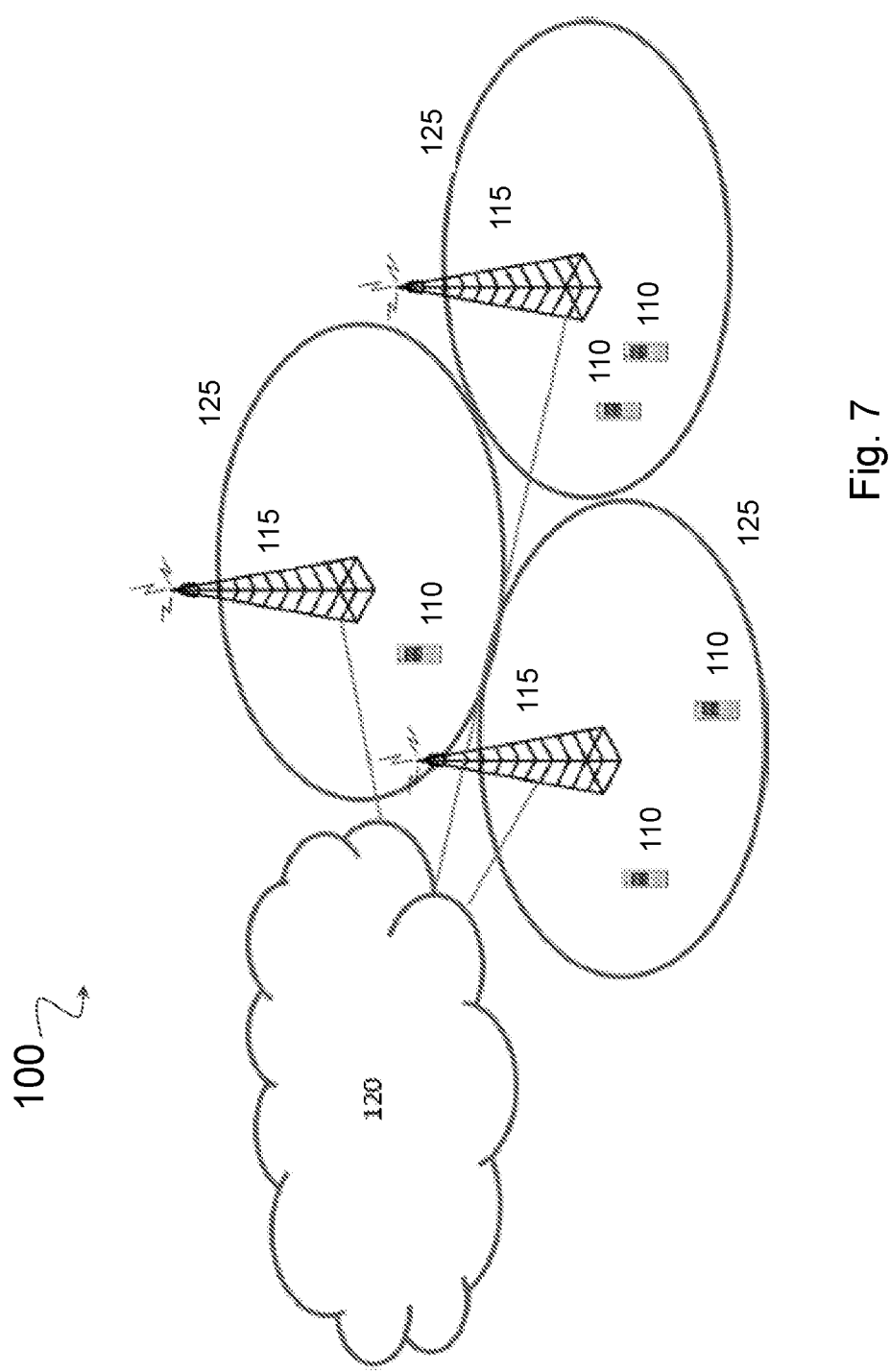
FIG. 7 is a block diagram illustrating an example wireless network, in accordance with particular embodiments.

FIG. 7 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

Figure 8:
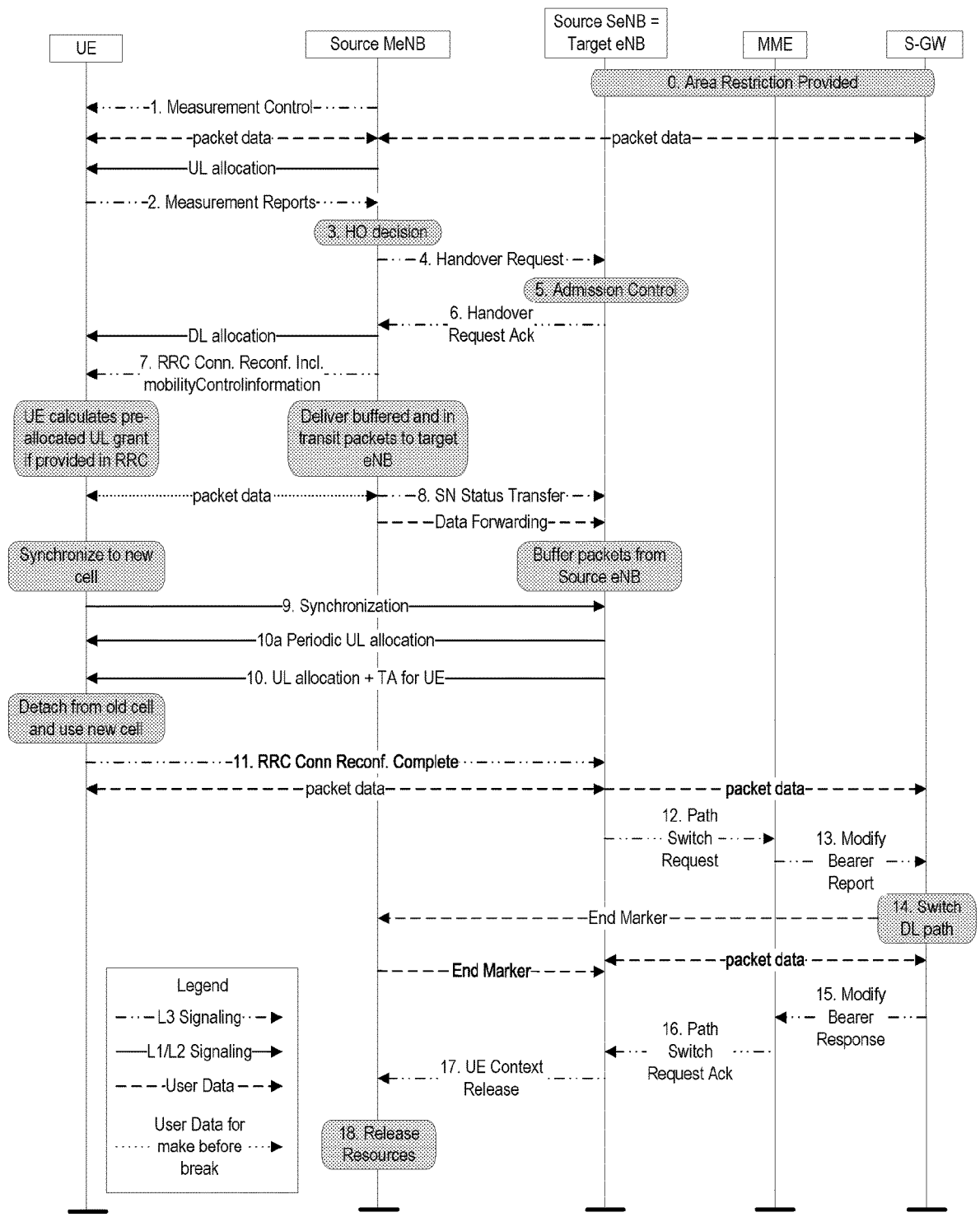
FIG. 8 is a diagram illustrating signaling flow for a handover procedure from a master node to a target network node, in accordance with particular embodiments.

In particular embodiments, network 100 implements handover of a UE 110 from one network node 115 to another network node 115 with 0 ms user plane interruption using the handover procedures discussed in greater detail with respect to FIG. 8.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments, the generic terminology, "radio network node" (or simply "network node") is used. It can be any kind of network node, which may comprise a base station (BS), radio base station, Node B, multi-standard radio (MSR) radio node such as MSR BS, evolved Node B (eNB), gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel. Example embodiments of UE 110, network nodes 115, and other network nodes (such as radio network controller or core network node) are described in more detail below with respect to FIGS. 9-10.

Although FIG. 7 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network or NR network, the embodiments may be implemented in any appropriate type of telecommunication system supporting any suitable communication standards and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, embodiments of a wireless network may include one or more UEs and one or more different types of radio network nodes capable of communicating with the UEs. The network may also include any additional elements suitable to support communication between UEs or between a UE and another communication device (such as a landline telephone). A UE may include any suitable combination of hardware and/or software. For example, in particular embodiments, a UE, such as UE 110, may include the components described with respect to FIG. 9A below. Similarly, a network node may include any suitable combination of hardware and/or software. For example, in particular embodiments, a network node, such as network node 115, may include the components described with respect to FIG. 10A below.

Figures 1, 2:
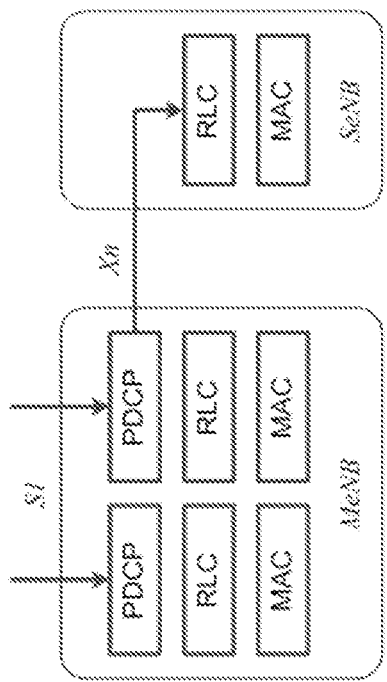
FIG. 1 is a block diagram illustrating routing of traffic to a secondary node through a direct bearer.
FIG. 2 is a block diagram illustrating routing of traffic to a secondary node through a split bearer.
Figure 3:
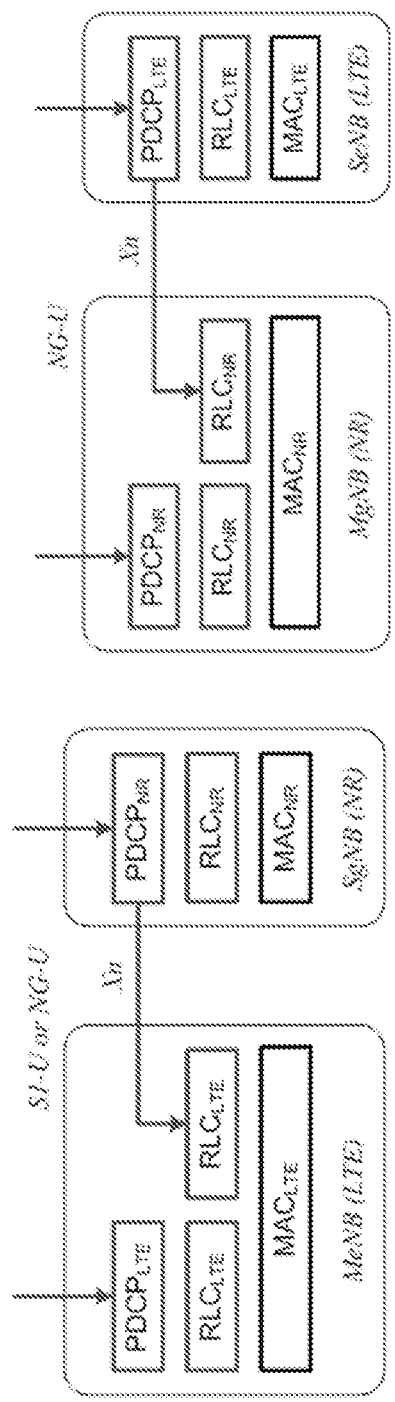
FIG. 3 is block diagram illustrating routing of traffic to a secondary node through a split bearer for LTE-NR.
Figure 4:
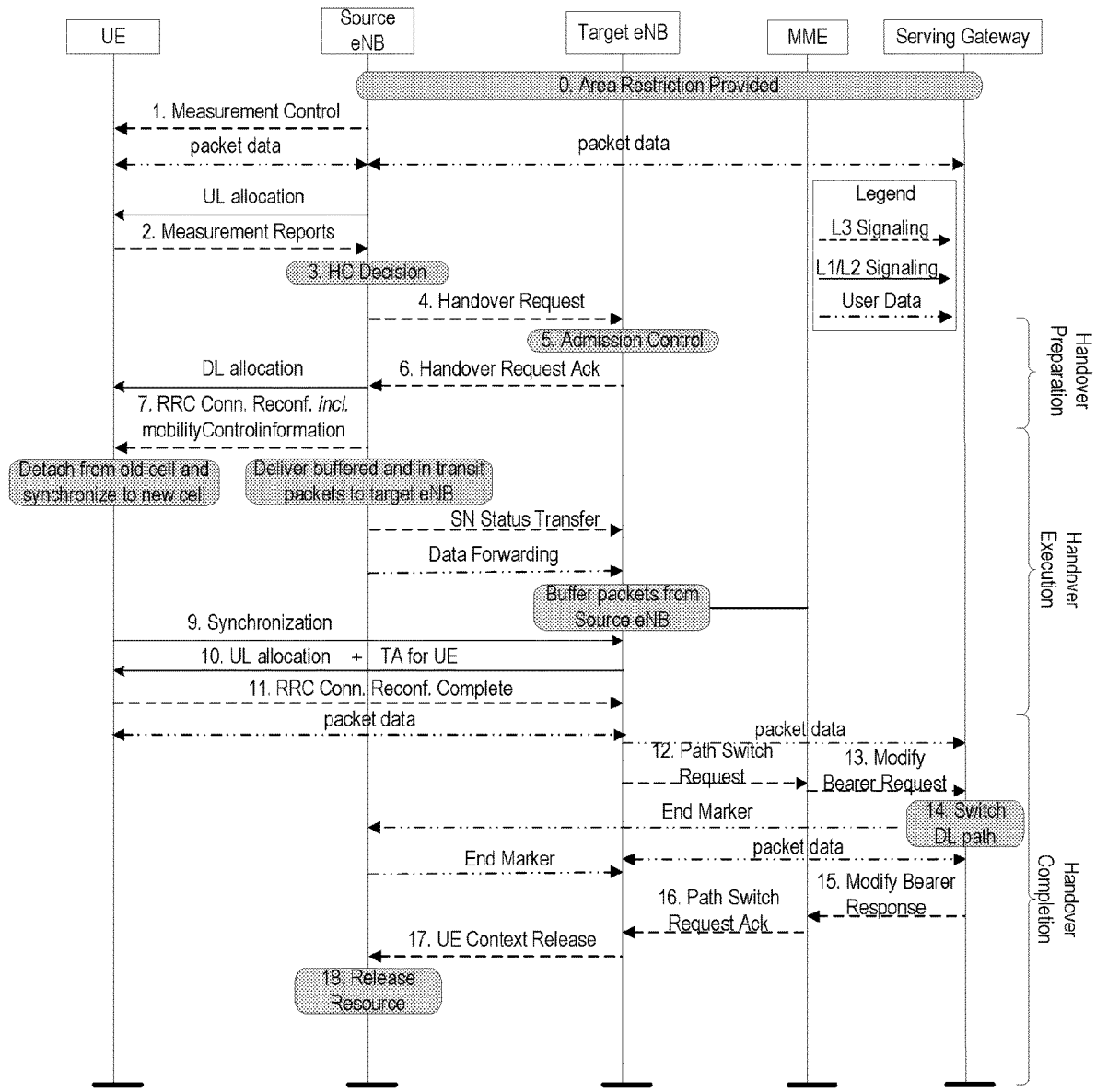
FIG. 4 is a diagram illustrating signaling flow for an LTE handover operation.
Figure 5:
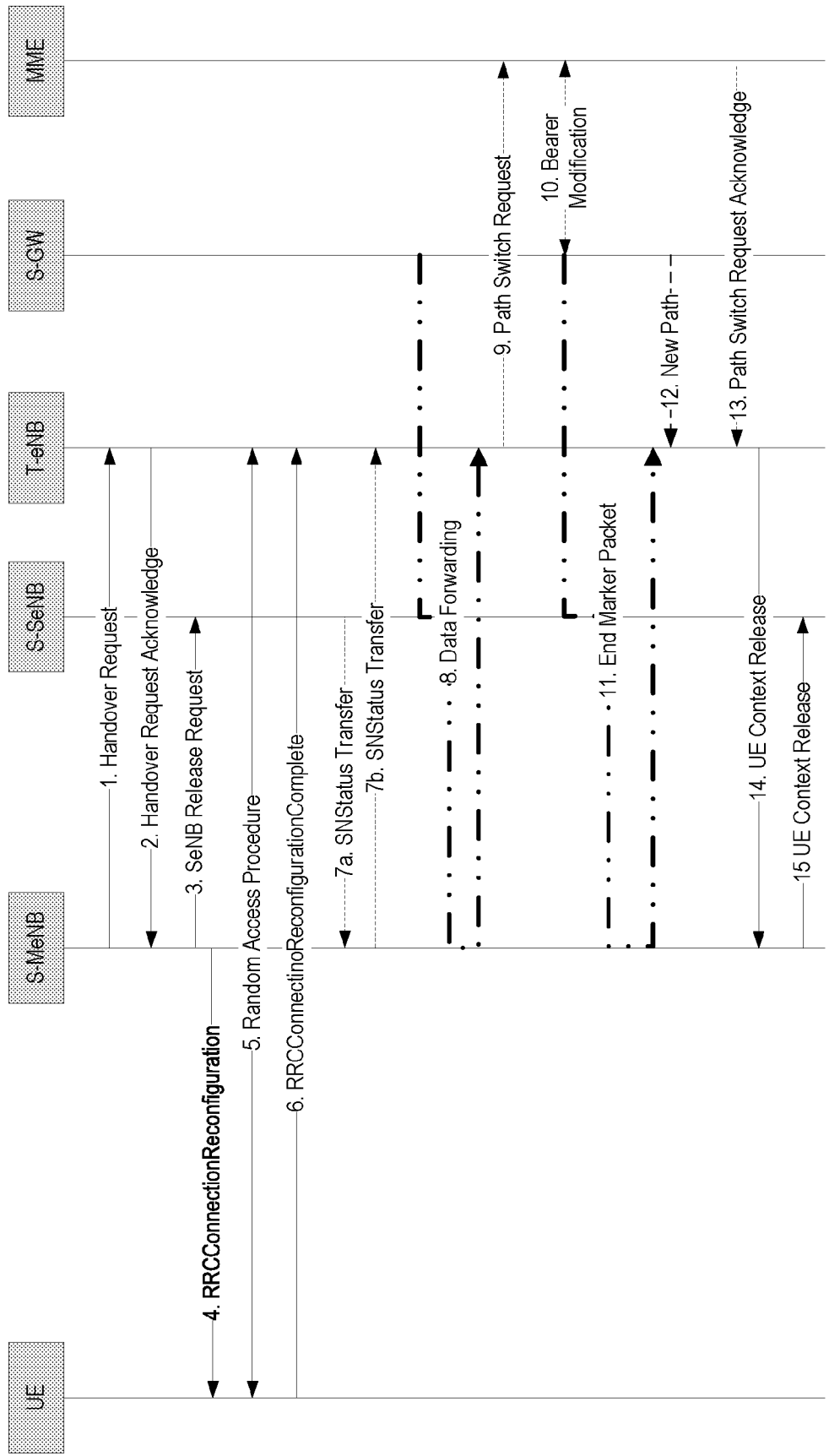
FIG. 5 is a diagram illustrating signaling flow for a master node to other network node change procedure.
Figure 6:
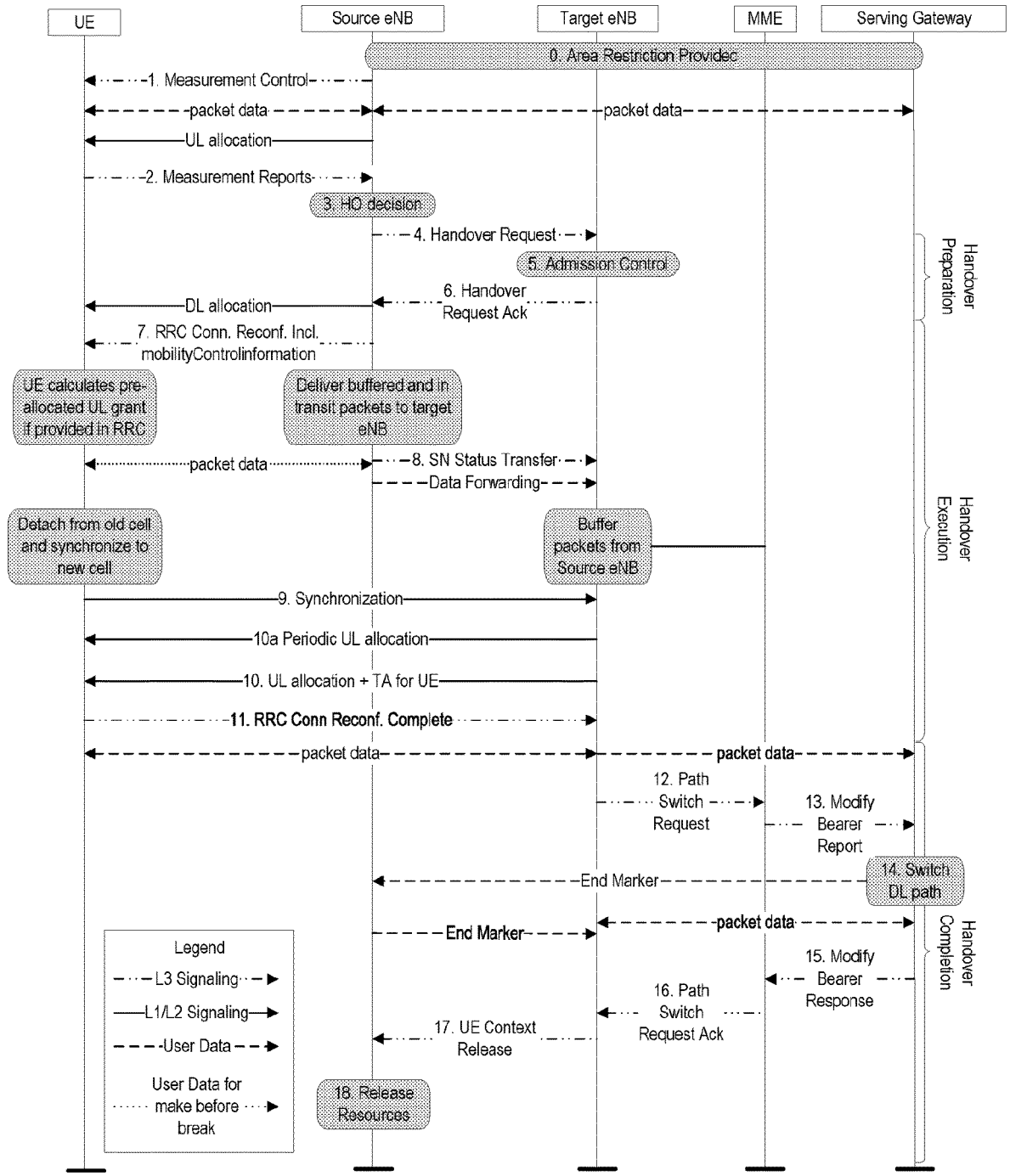
FIG. 6 is a diagram illustrating signaling flow for a handover procedure from a master node to a target network node.

FIG. 8 is a diagram illustrating signaling flow for a handover procedure from a master node to a target network node, in accordance with particular embodiments. Specifically, FIG. 8 illustrates an example procedure for how to achieve the 0 ms user plane interruption time for inter-frequency handovers in accordance with particular embodiments. One notable difference compared to the Rel-14 solution shown in FIG. 6 is between step 7 and step 11 (i.e., between RRCConnectionReconfiguration and RRCConnectionReconfigurationComplete). In the Rel-14 solution, the UE 110 can continue to transmit and receive data to the source eNB until it needs to perform the synchronization to the target eNB. At that point it has to stop transmitting to the source eNB and start synchronizing with the target eNB before it can transmit and receive data from the target eNB since both eNBs are on the same frequency.

One embodiment of the present disclosure is shown in FIG. 8. In this embodiment, the UE 115 is in dual connectivity between the MeNB and SeNB, and receives in step 7 a RRCConnectionReconfiguration message, including a reconfiguration where the old SeNB (source SCG) of the UE 115 is reconfigured to become the target eNB (target PCell). The RRCConnectionReconfiguration message may also include any necessary information for the UE 115 to generate new security keys to be used in the new configuration. In some embodiments, the RRCConnectionReconfiguration message may also include the setup of a new target SeNB (target SCG). The RRCConnectionReconfiguration message can include an indication that the UE 115 shall take the new configuration into use once it receives a dynamic UL allocation or DL assignment from the target PCell, using the new C-RNTI received in the RRCConnectionReconfiguration message. In case the source SCG PSCell is the same cell as the target PCell, the UE 115 can continue receiving and transmitting data using the old MCG+SCG up to the point that it switches to the new configuration. In case the source SCG PSCell is a different cell as the target PCell, the UE 115 continues to receive and transmit user data via the source MCG once it has received the RRCConnectionReconfiguration message, but stops monitoring the source SCG and starts monitoring the target eNB. If the target PCell is not synchronized with the source SCG, the UE 115 may perform step 9 to obtain DL synchronization with the target PCell.

In some embodiments, the indication to switch to the new configuration can also be a random access allocation in the target PCell received in the RRCConnectionReconfiguration message. In some embodiments, the indication to switch to the new configuration can also be a pre-allocated UL allocation or DL assignment in the target PCell. Since there is an uncertainty as to how long it takes for the UE 115 to react to the RRCConnectionReconfiguration, the pre-allocated UL grant can be either set to a sufficiently long time (ensuring that any reasonable UE 115 has time to finish the reconfiguration) or that the target eNB continues to try to send the UL allocation/DL assignments until the UE 115 responds.

Certain embodiments of the present disclosure are explained in greater detail below with respect to steps 7-11 of FIG. 8.

7) RRC Connection Reconfiguration including mobility-ControlInformation: UE 115 is instructed by source MeNB to handover to target SeNB. The message can also include UL grants that indicate to the UE 115 when to take the new configuration into use. In addition, the UE 115 can be instructed to stop using the SCG in case target PCell is not the same cell as the source SCG PSCell, and calculate a new KEY for the target eNB (source SeNB) and wait until it receives a UL grant or DL assignment with the new (C-)RNTI associated with the target PCell.

8) The source MeNB begin to forward DL data to the target eNB, possibly duplicating this so that the data is in both eNBs. The exact timing of start of data forwarding can be either before, during or after the handover, depending on network implementation.

9) If the target PCell is the same cell as the source PSCell, the UE 115 is already synchronized with it, and this step is omitted. If target PCell is not synchronized with the source SCG PSCell, the UE 115 establishes DL synchronization with the target PCell. If RACH-less handover is not configured, the UE 115 performs a Random Access at this stage.

10) If the UE 115 is not configured with RACH-less handover, the UE 115 receives a UL allocation.
   a) If the UE 115 is configured with RACH-less handover, the target eNB send periodic UL allocation. As the eNB doesn't know how long time it takes for the UE 115 to perform the RRCConnectionReconfiguration, the gNB need to try multiple times (periodically) until the UE 115 responds.

11) When the UE 115 receives the UL allocation with the new C-RNTI of the target PCell, it sends a RRC Conn. Reconf. Complete to the target PCell and from this point any new UP data is sent using the new configuration. At the same time, the UE 115 stops using the old configuration, i.e. stops communicating with source MeNB.

In the meantime, the source MeNB and Source SeNB ensure that any packet buffer in UL or DL is forwarded to the Target eNB and any reordering is taken care of (e.g. in PDCP or RLC).

In some embodiments, in step 7, the UE 115 is instructed to keep using the old S-KeNB (key for SeNB) as well as the MCG link until it receives the UL allocation. This will require the UE 115 to keep track of 3 different KeNB simultaneously (old, KeNB, old S-KeNB, new KeNB). The benefit of this is that the UE 115 can continue to use the SCG longer.

In another embodiment, the UE 115 is instructed in step 7 to calculate both the new KeNB and the new S-KeNB. In some embodiments, the new S-KeNB may be calculated using a SCG-counter (in addition to other inputs). For NR, in some embodiments, a new S-gNB may be calculated using an SK-counter. When the UE 115 receives the UL allocation, it switches the old MCG bearer to the target eNB and switches the old SCG bearer to the target SeNB.

In another embodiment, the UE 115 uses a split MCG bearer and is instructed in step 7 to switch the MCG part of the split bearer to the target MeNB and the SCG part of the split bearer to the target SeNB when it receives the UL allocation.

In another embodiment, the UE 115 uses a split SCG bearer and is instructed in step 7 to switch the SCG part of the split bearer to the target SeNB and the MCG part of the split bearer to the target MeNB when it receives the UL allocation.

In another embodiment, the UE 115 is instructed to calculate both the new KeNB and the new S-KeNB, but keep using the old KeNB and S-KeNB until it receives the UL allocation. This is applicable for both MCG bearer, SCG bearers, MCG-split bearer and SCG-split bearer.

In particular embodiments such as those discussed above, the UE 115 can receive a DL assignment instead of a UL allocation to trigger the switch. Moreover, the foregoing embodiments have been discussed in terms of 4G/LTE using eNBs, KeNB, S-KeNB, RRCConnectionReconfiguration, etc. However, embodiments of the present disclosure apply to other network types, including NR. For example, eNBs may be gNBs (e.g., MgNB, SgNB, etc.) and security keys may be S-KgNB, KgNB, etc. For example, for EN-DC security, similar to LTE behavior, UE 115 may calcualte S-KgNB based on the SK-counter provided by the MeNB and any other additional inputs. As another example, while RRCConnectionReconfiguration may be used for LTE, for NR RRC, RRCReconfiguration may be used.

In-Band Signaling of Switching

In some embodiments, the source MeNB includes an indication in the PDCP messages sent to the UE 115 to signal which keys to be used.

The UE 115 keeps using the old keys transmitting to the old MeNB but calculates and prepares to use the new keys toward the target eNB. When the UE 115 receives a DL packet containing an indication to switch keys in the PDCP, the UE 115 begin to use the new key and send its subsequent UL messages using the new key. In some embodiments, instead of a PDCP message an RRC message may be used.

Figure 9B:
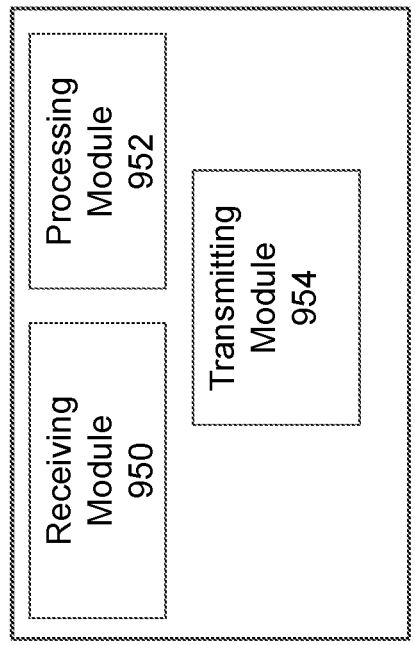
FIG. 9B is a block diagram illustrating example components of a wireless device, in accordance with particular embodiments.
Figure 9A:
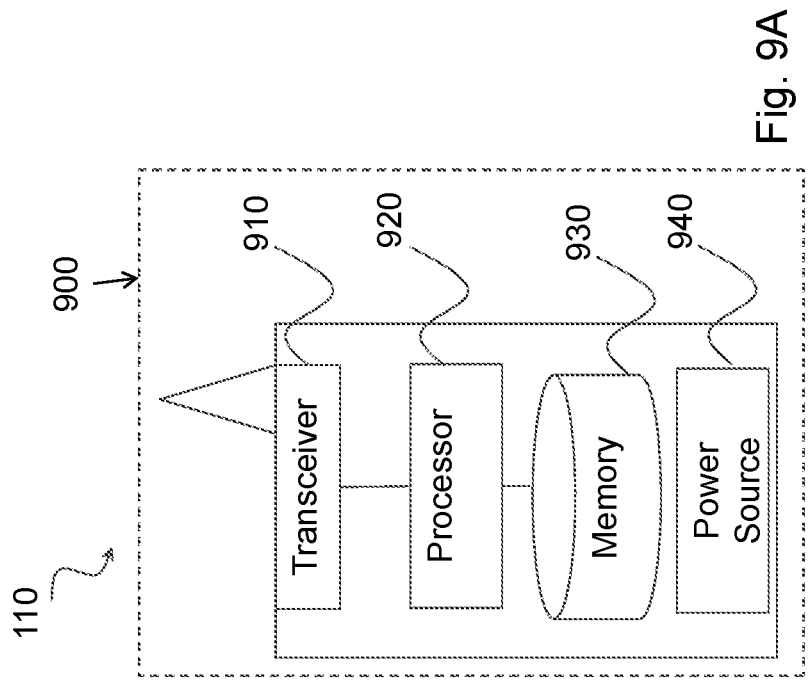
FIG. 9A is a block diagram illustrating an example embodiment of a wireless device, in accordance with particular embodiments.

FIG. 9A is a block diagram illustrating an example embodiment of a UE 115 or wireless device. The wireless device is an example of the wireless devices 110 illustrated in FIG. 7. In particular embodiments, the wireless device is capable of implementing the handover procedures for 0 ms user plane interruption as described above with respect to particular embodiments.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 900. Processing circuitry 900 includes transceiver 910, processor 920, memory 930, and power source 940. In some embodiments, transceiver 910 facilitates transmitting wireless signals to and receiving wireless signals from wireless network node 115 (e.g., via an antenna), processor 920 executes instructions to provide some or all of the functionality described herein as provided by the wireless device, and memory 930 stores the instructions executed by processor 920. Power source 940 supplies electrical power to one or more of the components of wireless device 110, such as transceiver 910, processor 920, and/or memory 930.

Processor 920 includes any suitable combination of hardware and software implemented in one or more integrated circuits or modules to execute instructions and manipulate data to perform some or all of the described functions of the wireless device. In some embodiments, processor 920 may include, for example, one or more computers, one more programmable logic devices, one or more central processing units (CPUs), one or more microprocessors, one or more applications, and/or other logic, and/or any suitable combination of the preceding. Processor 920 may include analog and/or digital circuitry configured to perform some or all of the described functions of wireless device 110. For example, processor 920 may include resistors, capacitors, inductors, transistors, diodes, and/or any other suitable circuit components.

Memory 930 is generally operable to store computer executable code and data. Examples of memory 930 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 940 is generally operable to supply electrical power to the components of wireless device 110. Power source 940 may include any suitable type of battery, such as lithium-ion, lithium-air, lithium polymer, nickel cadmium, nickel metal hydride, or any other suitable type of battery for supplying power to a wireless device. In particular embodiments, processor 920 in communication with transceiver 910 transmits and/or receives wireless signals in a network capable of supporting more than one numerology.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. In general, the components may include receiving module 950, processing module 952, and transmitting module 956.

Receiving module 950 may perform the receiving functions of wireless device 110. For example, receiving module 950 may receive wireless signals from network nodes 115 to implement the handover procedures for 0 ms user plane interruption discussed above. In some embodiments, receiving module 950 may receive a reconfiguration instruction from a master node. The reconfiguration instruction may include a new configuration wherein a secondary node is a target secondary node; and an indication of a trigger used to switch to the new configuration. The receiving module 950 may also receive the trigger from the target secondary node. In certain embodiments, receiving module 950 may include or be included in processor 920. In particular embodiments, receiving module 950 may communicate with processing module 952.

Processing module 952 may perform the processing functions of wireless device 110, such as those described above to implement handover procedures for 0 ms user plane interruption. In certain embodiments, processing module 952 may cause the wireless device 115 to operate in dual connectivity with a master node and a secondary node. In some embodiments, processing module 952 may cause wireless device 115 to switch to a new configuration indicated in a reconfiguration message received from the master node. In certain embodiments, processing module 952 may include or be included in processor 920. In particular embodiments, processing module 952 may communicate with requirement receiving module 950 and transmitting module 956.

Transmitting module 954 may perform the transmitting functions of wireless device 110. For example, transmitting module 954 may transmit wireless signals to network nodes 115 to implement to implement handover procedures for 0 ms user plane interruption. In certain embodiments, transmitting module 954 may include or be included in processor 920. In particular embodiments, transmitting module 954 may communicate with processing module 952.

Figure 10B:
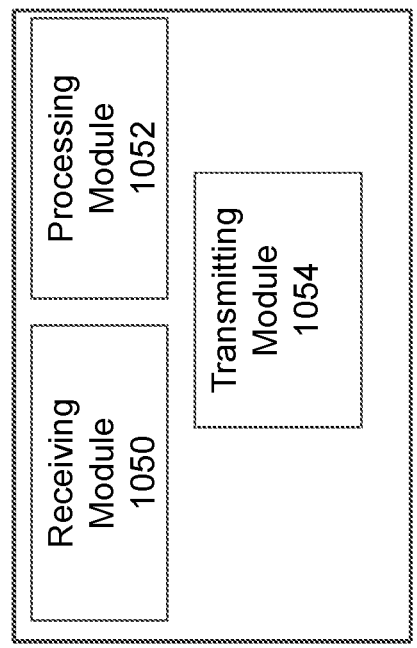
FIG. 10B is a block diagram illustrating example components of a wireless device, in accordance with particular embodiments.
Figure 10A:
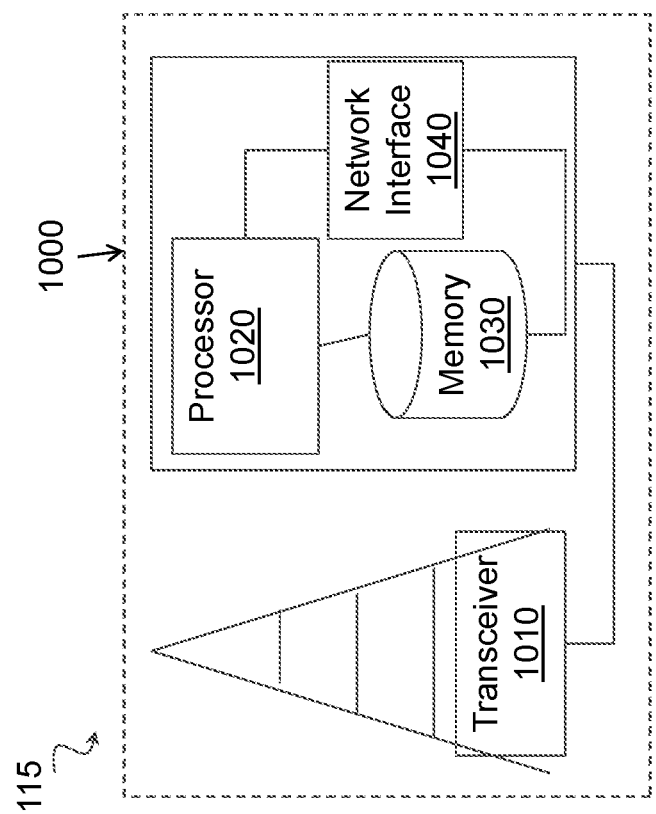
FIG. 10A is a block diagram illustrating an example embodiment of a network node, in accordance with particular embodiments.

FIG. 10A is a block diagram illustrating an example embodiment of a network node 115. The network node is an example of the network node 115 illustrated in FIG. 8. In particular embodiments, the network node is capable of supporting the implementation of handover procedures for 0 ms user plane interruption described herein.

Network node 115 can be an eNodeB, a nodeB, a gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes processing circuitry 1000. Processing circuitry 1000 includes at least one transceiver 1010, at least one processor 1020, at least one memory 1030, and at least one network interface 1040. Transceiver 1010 facilitates transmitting wireless signals to and receiving wireless signals from a wireless device, such as wireless devices 110 (e.g., via an antenna); processor 1020 executes instructions to provide some or all of the functionality described above as being provided by a network node 115; memory 1030 stores the instructions executed by processor 1020; and network interface 1040 communicates signals to backend network components, such as a gateway, switch, router, Internet, Public Switched Telephone Network (PSTN), controller, and/or other network nodes 115. Processor 1020 and memory 1030 can be of the same types as described with respect to processor 920 and memory 930 of FIG. 9A above.

In some embodiments, network interface 1040 is communicatively coupled to processor 1020 and refers to any suitable device operable to receive input for network node 115, send output from network node 115, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network. In particular embodiments, processor 1020 in communication with transceiver 1010 transmits and/or receives wireless signals to implement the handover procedures for 0 ms user plane interruption described above.

Other embodiments of network node 115 include additional components (beyond those shown in FIG. 10A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 10B is a block diagram illustrating example components of a network node 115. In general, the components of may include receiving module 1050, processing module 1052, and transmitting module 1054.

Receiving module 1050 may perform the receiving functions of network node 115. For example, receiving module 1050 may receive wireless signals from wireless device 110 to implement the handover procedures for 0 ms user plane interruption described above. In some embodiments, network node 115 may be a master node (e.g., a MeNB, MgNG). Receiving module 1050 may receive a handover request acknowledge message from a secondary node (e.g., SeNB, SgNB). In certain embodiments, network node 115 may be a secondary node, and receiving module 1050 may receive a handover request message from a master node. In certain embodiments, receiving module 1050 may include or be included in processor 1020. In particular embodiments, receiving module 1050 may communicate with processing module 1052.

Processing module 1052 may perform the adapting functions of network node 115. For example, processing module 1052 may facilitate the dual connectivity handover procedures described above. In certain embodiments, network node 115 may operate as a master node and processing module 1052 may duplicate downlink data so that the downlink data is available for use by the master node and for forwarding to a target secondary node. In certain embodiments, processing module 1052 may include or be included in processor 1020. In particular embodiments, processing module 1052 may communicate with receiving module 1050 and transmitting module 1054.

Transmitting module 1054 may perform the transmitting functions of network node 115. For example, transmitting module 1054 may transmit wireless signals to wireless device 110. In certain embodiments, transmitting module 1054 may include or be included in processor 1020.

In certain embodiments, network node 115 may operate as a master node and transmitting module 1054 may transmit a handover request message to a secondary node. In some embodiments, the transmitting module 1054 may transmit a reconfiguration instruction to wireless device 110, when wireless device 110 is operating in a dual connectivity mode with the master node and a secondary node. The reconfiguration instruction may include a new configuration (or an indication of a new configuration) wherein the secondary node is (or becomes) a target secondary node. The reconfiguration instruction may also include an indication of a trigger used to switch to the new configuration.

In certain embodiments, network node 115 may operate as a secondary node and transmitting module 1054 may transmit a handover request acknowledge message to a master node. Transmitting module 1054 may also transmit a trigger to wireless device 110. The wireless device 110 may be operating in dual connectivity with the master node and the secondary node. The trigger may indicate that the wireless device 110 is to switch to a new configuration wherein the secondary node becomes a target secondary node. In particular embodiments, transmitting module 1054 may communicate with processing module 1052.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. For example, embodiments of the present disclosure have discussed security keys used in LTE, including KeNB, SeNB, and S-KeNB. Use of these key names is merely illustrative, as keys with different names but the same or similar functionality may be added or introduced in NR (e.g., KgNB, SgNB, and/or S-KgNB). Accordingly, the above description of the embodiments does not constrain this disclosure. Other changes, substitutions, and alterations are possible without departing from the spirit and scope of this disclosure, as defined by the claims below.

Abbreviations used in the preceding description include:
Abbreviation Explanation
3GPP Third Generation Partnership Project
BLER Block Error Rate
BS Base Station
BTS Base Transceiver Station
D2D Device to Device
DL Downlink
eNB eNodeB
EVM Error Vector Magnitude
FFT Fast Fourier Transform
GHz Giga Hertz
kHz Kilo Hertz
LTE Long Term Evolution
M2M Machine to Machine
MBB Mobile Broadband
MIMO Multi-Input Multi-Output
MTC Machine Type Communication
NR New Radio
OFDM Orthogonal Frequency Division Multiplex
PRB Physical Resource Block
RAN Radio Access Network
RAT Radio Access Technology
RB Resource Block
RNC Radio Network Controller
RRC Radio Resource Control
RRH Remote Radio Head
RRU Remote Radio Unit
RX Receive
SINR Signal to Interference and Noise Ratio
TDD Time Division Duplex
TX Transmit
UE User Equipment
UL Uplink
URLLC Ultra Reliable Low Latency Communication
Usec Micro Seconds
UTRAN Universal Terrestrial Radio Access Network
V2V Vehicle to Vehicle
V2X Vehicle to Infrastructure
WAN Wireless Access Network

The invention claimed is:

1. A method in a wireless device for reducing user plane interruption delay during a handover from dual connectivity with a master node (MN) and a secondary node (SN) to a target network node, the method comprising:
operating in dual connectivity with the MN and the SN;
receiving a reconfiguration instruction from the MN, the reconfiguration instruction comprising:
a new configuration wherein the target network node for the handover is the SN which is a target SN;
an indication that the wireless device switches to the new configuration once it receives a dynamic uplink allocation or downlink assignment received from the target SN, wherein the downlink assignment is received using a new C-RNTI received in the reconfiguration instruction, and wherein the new C-RNTI is associated with the target SN; and
information for the UE to generate new security keys to be used in the new configuration;
synchronizing to the target SN, wherein when a source cell is same as the target SN, the wireless device continues receiving and transmitting data using old master cell group and old secondary cell group (MCG+SCG) up to a point that that the wireless device switches to the new configuration, and wherein when the source cell is a different cell as the target SN, the wireless device continues to receive and transmit user data via the source cell once it has received the reconfiguration instruction but stops monitoring the source cell and starts monitoring the target SN;
receiving a trigger from the target SN to switch to the new configuration; and
switching from the dual connectivity with the MN and the SN to a single connection to the target SN based on reception of the trigger after synchronizing to the target SN.

2. The method of claim 1, wherein the trigger to switch to the new configuration is one of:
a random access allocation received from the target SN; or
a pre-allocated uplink allocation or downlink assignment received from the target SN.

3. The method of claim 1, wherein the reconfiguration instruction further comprises security key information for the new configuration.

4. The method of claim 3, wherein the security key information comprises an instruction to utilize a previously derived S-KeNB.

5. The method of claim 3, wherein the security key information comprises an instruction to calculate a new KeNB and a new S-KeNB.

6. The method of claim 3, wherein an old KeNB and an old S-KeNB are used while operating in dual connectivity, and the security key information comprises one or more instructions to:
 calculate a new KeNB;
 calculate a new S-KeNB;
 change from the old KeNB to the new KeNB when the trigger is received; and
 change from the old S-KeNB to the new S-KeNB when the trigger is received.

7. The method of claim 1, wherein operating in dual connectivity comprises using an MCG bearer with the MN and an SCG bearer with the SN, and the reconfiguration instruction further comprises instructions to:
 switch the MCG bearer to the target SN when the trigger is received; and
 switch the SCG bearer to the MN when the trigger is received.

8. The method of claim 1, wherein operating in dual connectivity comprises using a split MCG bearer, and the reconfiguration instruction further comprises instructions to:
 switch a MCG part of the split MCG bearer to the target SN when the trigger is received; and
 switch a secondary cell group (SCG) part of the MCG bearer to the MN when the trigger is received.

9. The method of claim 1, wherein operating in dual connectivity comprises using a split secondary cell group (SCG) bearer, and the reconfiguration instruction further comprises instructions to:
 switch MCG part of the split SCG bearer to the target SN when the trigger is received; and
 switch a SCG part of the split SCG bearer to the MN when the trigger is received.

10. A wireless device for reducing user plane interruption delay during a handover from dual connectivity with a master node (MN) and a secondary node (SN) to a target network node, the wireless device comprising:
 processing circuitry configured to operate in dual connectivity with the MN and the SN;
 a transceiver operably coupled the processing circuitry, the transceiver configured to:
  receive a reconfiguration instruction from the MN, the reconfiguration instruction comprising:
   a new configuration wherein the target network node for the handover is the SN which is a target SN;
   an indication that the wireless device switches to the new configuration once it receives a dynamic uplink allocation or downlink assignment received from the target SN, wherein the downlink assignment is received using a new C-RNTI received in the reconfiguration instruction, and wherein the new C-RNTI is associated with the target SN; and
   information for the UE to generate new security keys to be used in the new configuration;
  receive a trigger from the target SN to switch to the new configuration; and
 the processing circuitry further configured to:
  synchronize to the target SN, wherein if a source cell is same as the target SN, the wireless device continues receiving and transmitting data using old master cell group and old secondary cell group (MCG+SCG) up to a point that that the wireless device switches to the new configuration, and wherein if the source cell is a different cell as the target SN, the wireless device continues to receive and transmit user data via the source cell once it has received the reconfiguration instruction but stops monitoring the source cell and starts monitoring the target SN; and
  switch from the dual connectivity with the MN and the SN to a single connection to the target SN based on reception of the trigger after synchronizing to the target SN.

11. The wireless device of claim 10, wherein the trigger to switch to the new configuration is one of:
 a random access allocation received from the target SN; or
 a pre-allocated uplink allocation or downlink assignment received from the target SN.

12. The wireless device of claim 10, wherein the reconfiguration instruction further comprises security key information for the new configuration.

13. The wireless device of claim 12, wherein the security key information comprises an instruction to utilize a previously derived S-KeNB.

14. The wireless device of claim 12, wherein the security key information comprises an instruction to calculate a new KeNB and a new S-KeNB.

15. The wireless device of claim 12, wherein an old KeNB and an old S-KeNB are used while operating in dual connectivity, and the security key information comprises one or more instructions to:
 calculate a new KeNB;
 calculate a new S-KeNB;
 change from the old KeNB to the new KeNB when the trigger is received; and
 change from the old S-KeNB to the new S-KeNB when the trigger is received.

16. The wireless device of claim 10, wherein the transceiver is further operable to receive, from the MN, an indication in a PDCP message of one or more security keys to utilize in the new configuration.

17. The wireless device of claim 16, wherein an old KeNB and an old S-KeNB are used while operating in dual connectivity, and the processing circuitry (920) is further configured to:
 calculate a new KeNB;
 calculate a new S-KeNB;
 change from the old KeNB to the new KeNB when the trigger is received; and
 change from the old S-KeNB to the new S-KeNB when the trigger is received.

18. The wireless device of claim 10, wherein operating in dual connectivity comprises using an MCG bearer with the MN and an SCG bearer with the SN, and the reconfiguration instruction further comprises instructions to:
 switch the MCG bearer to the target SN when the trigger is received; and
 switch the SCG bearer to the MN when the trigger is received.

19. The wireless device of claim 10, wherein operating in dual connectivity comprises using a split MCG bearer, and the reconfiguration instruction further comprises instructions to:
 switch a MCG part of the split MCG bearer to the target SN when the trigger is received; and
 switch a secondary cell group (SCG) part of the MCG bearer to the MN when the trigger is received.

20. The wireless device of claim 10, wherein operating in dual connectivity comprises using a split SCG bearer, wherein the reconfiguration instruction further comprises instructions to:

switch MCG part of the split SCG bearer to the target SN when the trigger is received; and switch a SCG part of the split SCG bearer to the MN when the trigger is received.

* * * * *